Patented Mar. 27, 1923.

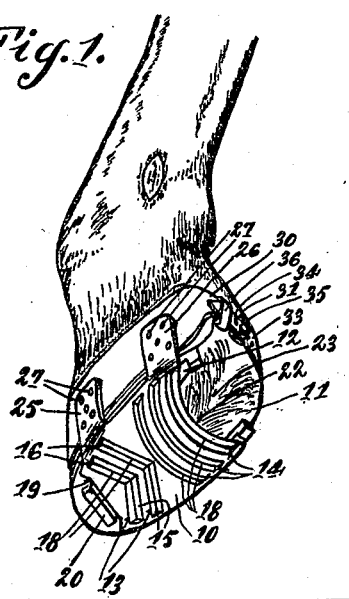

1,449,796

UNITED STATES PATENT OFFICE.

JOSEPH TORCHIA, OF CINCINNATI, OHIO.

ANTISKID DEVICE FOR SHOD ANIMALS.

Application filed July 13, 1921. Serial No. 484,428.

*To all whom it may concern:*

Be it known that I, JOSEPH TORCHIA, a citizen of the United States, residing at Cincinnati, in the county of Hamilton and State of Ohio, have invented certain new and useful Improvements in Antiskid Devices for Shod Animals, of which the following is a specification.

My invention relates to anti-skid devices adapted to be attached to the hoofs and over the shoes of shod animals to prevent their slipping when driven over slippery surfaces, as for instance, roadways on which snow has fallen or ice has formed. My improved device is more particularly adapted to be secured over the shoes of horses and is herein described in this connection.

A great deal of useless effort is exerted by horses when being driven over icy roadways by not being able to obtain a satisfactory foothold. Also great suffering is caused by the horses falling and breaking their limbs. This results in the only humane action possible, the enforced killing of the animal thus injured, which is always a considerable economic loss to his owners.

My invention has for its object the provision of a device capable of being attached to horses' hoofs to prevent their slipping on icy surfaces; further, to provide a means whereby the device is readily and rapidly attached to the hoof and removed therefrom; further, to avoid the cost and delay incident to having an animal sharp-shod; further, to so construct my improved device as to prevent injury to the hoof; further, to be enabled to attach the same without in any way disturbing the shoes already on the animal; further, to avoid the accumulation of snow and ice on the device or in the frog of the hoof; and further, to provide a device of greatly simplified construction and low cost of manufacture.

My invention consists of a resilient plate on the lower surface of which specially formed anti-skid ribs are secured, also of bendable lips on the plate to which straps are secured, and by which the plate is held in place on the horse's hoof.

My invention also consists in the parts and combination and arrangements thereof as herein described and claimed.

In the drawing:

Figure 1 is a perspective view of a horse's hoof having my improved anti-skid device secured thereon;

Fig. 2 is a bottom view of my improved device;

Fig. 3 is a side elevation; and

Fig. 4 is a vertical longitudinal section taken on the line 4—4 of Fig. 2.

In the embodiment of my invention as illustrated, a resilient plate 10 conforms generally in shape to the outline of a horse's hoof 11 and shoe 12. The plate is preferably formed of a very tough and resilient sheet metal having forwardly extending anti-skid ribs 13 and rearwardly extending anti-skid ribs 14 thereon. The forward ribs 13 comprise oblique branches 15 and 16 meeting at points on a median line drawn lengthwise of the plate. The rearwardly extending ribs 14 are formed on circular arcs whose centers are located in rear of the plate. Both the front and rearwardly extending ribs are triangular in cross-section and have bases 17 and sharp edges 18. The front edge of the plate has a depression 19 therein, adapted to contain a toe calk 20 of the shoe 12 secured in the usual manner to the hoof 11 of the horse. The rear edge of the plate is concaved as shown at 22, which leaves an opening 23 to enable ice and snow to be dislodged from the frog of the hoof in a manner as herein later described.

The forward corners of the plate have bendable lips 25 thereon adapted to be bent over the edge of the shoe and against the hoof. The rear corners of the plate have lips 26 thereon adapted to be bent in similar manner. The lips are secured by rivets 27 to a sheath 29, preferably formed of rawhide. One end of the sheath 29 has a strap 30 thereon which has a buckle 31 secured thereto as by loop 32. The other end of the sheath has a strap 33 thereon having holes 34 therein adapted to coact with a tongue 35 of the buckle 31. A second loop 36 is secured to the strap 30 whereby the end of the strap 33 is retained after passing through the buckle.

My improved device is readily attached and fitted to the hoof, by placing the plate with the triangular ribs thereon on the bottom of the shoe and bending the lips upwardly over the shoe and against the hoof. In this manner one size of plate may be closely fitted to several different sizes of hoofs. This feature has the additional advantage of enabling the device to be accurately fitted to the four different shoes of a horse even though there is a variation in size or shape.

The lips 25 partly enclose the forward parts of a hoof and prevent the plate from slipping backward on the shoe. Also when the animal places his foot and exerts backward pressure, the toe calk of the shoe transfers this pressure to the depression 19 in the front end of the plate which prevents its displacement on the shoe. After the lips are bent and fitted to the hoof, the strap 33 of the sheath which has meantime encircled the hoof is passed through the buckle 31, and drawn tight, the tongue 35 entering one of the holes 34. The free end of the strap 33 is then placed within the loop 36. In this manner the device is securely held on the hoof and shoe.

When the horse places his foot on an icy surface and there is a tendency to slip forward, the sharp edges of the ribs dig into the surface, the diagonal branches of the forward ribs forming pockets which pile up the snow or ice in such a manner as to provide additional resistance to slipping. As he exerts pressure in order to draw the load there is a tendency to slip backward, this is taken care of by the rear ribs which being formed on a curve will also form pockets to act in similar manner to the front ribs but present a broader surface. The varying angularity of the ribs to each other effectively guard against slipping in any direction.

The plate prevents the accumulation of snow or ice in the frog of the hoof by closing the space between the respective heels of the shoe. Should however ice form under the plate, dislodgement of the same is effected by the slight vibration of the plate which occurs when the horse places his hoofs on the ground. The opening formed by the concaved rear edge of the plate readily permits the matter thereunder to fall out. Any accumulation of snow or ice between the ribs on the bottom of the plate is dislodged by vibration of the plate in similar manner.

My improved device can be rapidly and readily placed on the hoof of the animal by almost anyone. This feature enables the driver to affix the device to the hoof when overtaken by sleet or snow storms while out on the road, thereby avoiding the possibility of an accident. Further, the necessity of having his animals sharp-shod is also avoided, which in turn avoids the delay and expense incident thereto. By employing this device greater security of footing is obtained as compared with the sharpening the toe and heel calks of the shoe, which does not guard against sidewise slipping. The sharp edge of the ribs lasts a great deal longer than the sharpened toe and heel calks of the horseshoe, as the device need only be worn when snow or ice is on the ground. This is not the case with the horseshoe which is worn continuously until the animal must be reshod.

What I claim as new and desire to secure by Letters Patent is:

1. In an anti-skid device for shod animals, a detachable plate adapted to engage the toe calk of a shoe and having a plurality of continuous sharp-edged ribs on its front lower surface, a plurality of continuous sharp-edged ribs on its rear lower surface disposed at a different angle from said first-named ribs, and means for securing said plate upon the shoe in engagement with the rear of the calk.

2. In an anti-skid device for shod animals, a plate adapted to rest upon the lower side of a horseshoe against its toe calk and to cover the frog and sole of the foot on which the shoe is mounted, a plurality of parallel sharp-edged ribs extending across the front of said plate on its lower side adjacent the toe calk, a plurality of sharp-edged ribs extending across the rear end of said plate out of parallel with said first-named shap-edged ribs, and means for securing said plate upon the shoe in engagement with the rear of the calk, substantially as set forth and for the purposes specified.

3. In an anti-skid device for shod animals, a plate adapted to detachably engage the lower side of a horseshoe and to cover the bottom of the animal's foot between the toe calk and the heel calks, and a plurality of sharp-edged ribs arranged parallel with each other on the lower front end of said plate adjacent said toe calk, a plurality of parallel curved ribs on the lower rear end of said plate adjacent the heel calks, and means for securing said plate upon the shoe in engagement with the rear of the calk, substantially as set forth and for the purposes specified.

4. In a device of the character described, a plate, forwardly extending sharp-edged ribs arranged at angles to each other on the front part of said plate, a plurality of sharp-edged curved ribs on the rear part of said plate whose ends extend away from said first-named ribs, bendable lips integrally formed with said plate, and straps secured to said lips, said lips and straps so arranged as to be fitted to and secured about the hoof of a shod animal.

5. In a device of the character described, a vibratable plate, a plurality of sharp-edged forwardly-extending ribs secured to the fore part of said plate and arranged at angles to each other, a plurality of sharp-edged curved rearwardly-extending ribs on the rear part of said plate, a plurality of upwardly turned and bendable lips integrally formed with said plate, a sheath of flexible material secured to said lips, a buckle on one end of said sheath, a strap on the other end of said sheath, said buckle, strap, and lips so arranged as to secure said plate to the hoof of a shod animal.

6. In a device of the character described, a vibratable plate, a plurality of sharp-edged ribs secured to one part of said plate and arranged obliquely to each other, a plurality of curved sharp-edged ribs secured to another part of said plate whose ends extend away from said first-named ribs, a plurality of upwardly curved and bendable lips integrally formed with said plate, a sheath secured to said lips adapted to encircle the hoof of a shod animal, a strap on one end of said sheath, and a buckle on the other end of said sheath whereby said plate is secured to the hoof of a shod animal, a horseshoe, a toe calk thereon, a depression in the forward part of said plate adapted to be received against said toe calk, and a concaved edge on the rear part of said plate whereby an opening is formed between said shoe and the hoof of a shod animal to permit the discharge of matter accumulated under said plate.

JOSEPH TORCHIA.